UNITED STATES PATENT OFFICE.

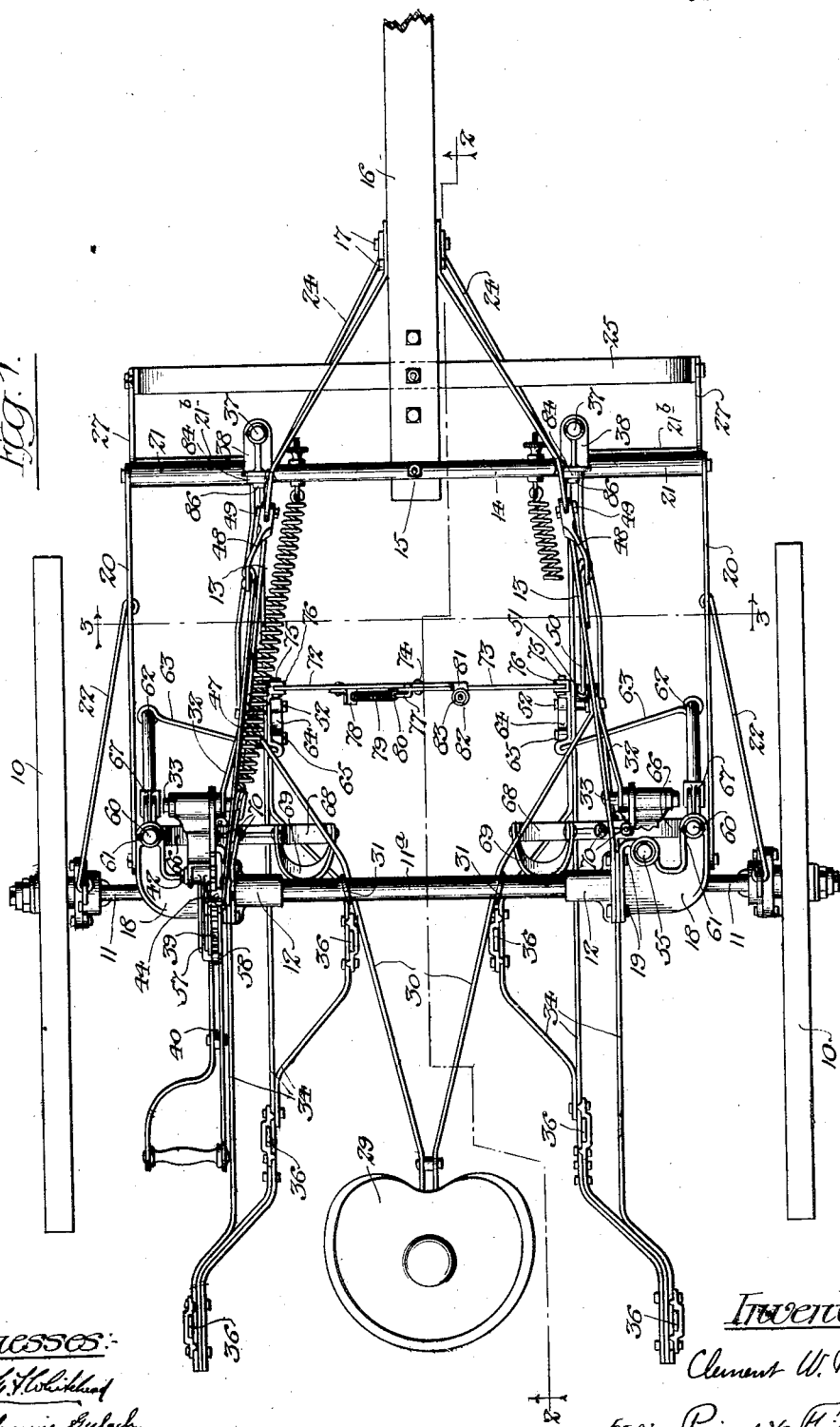

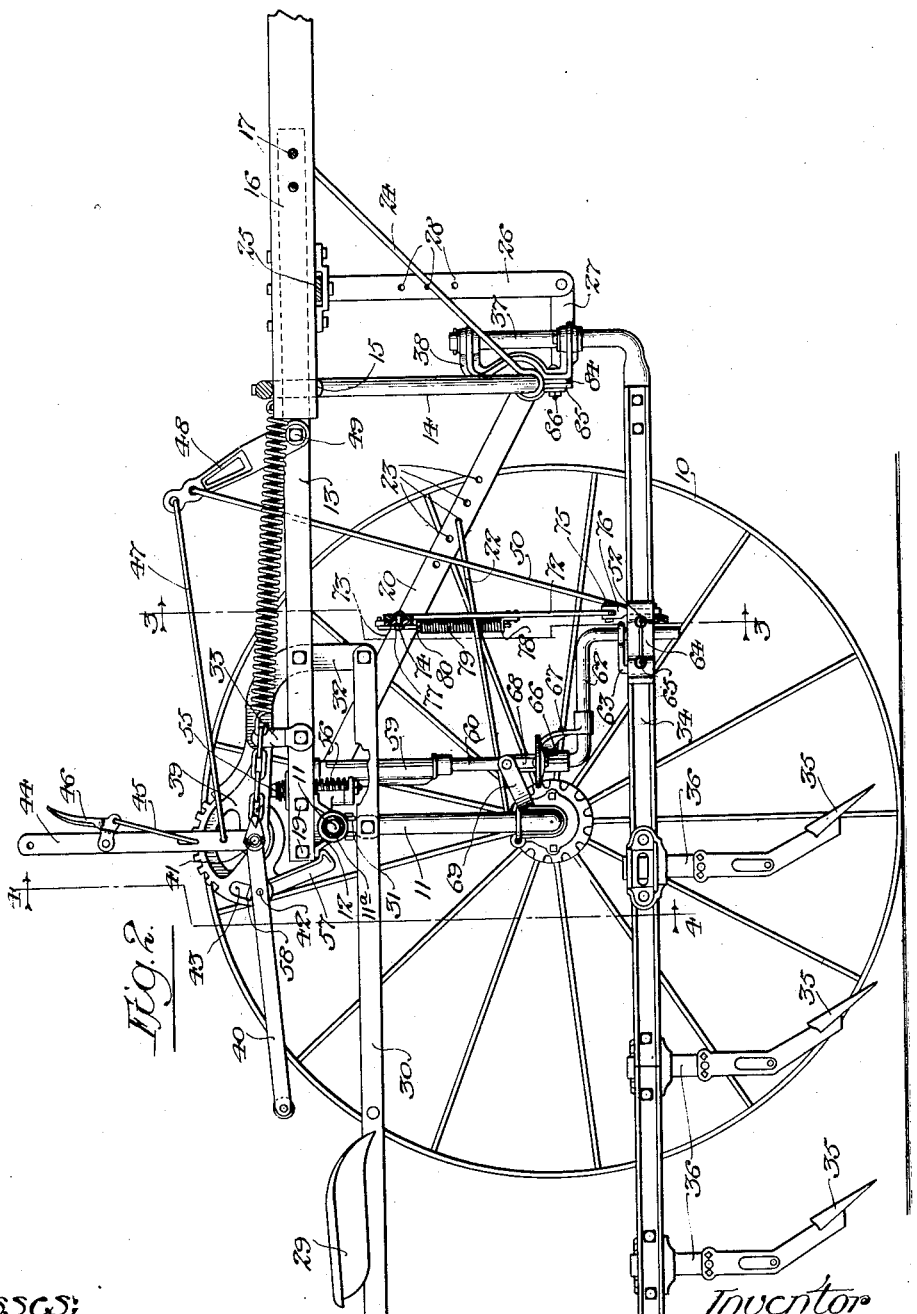

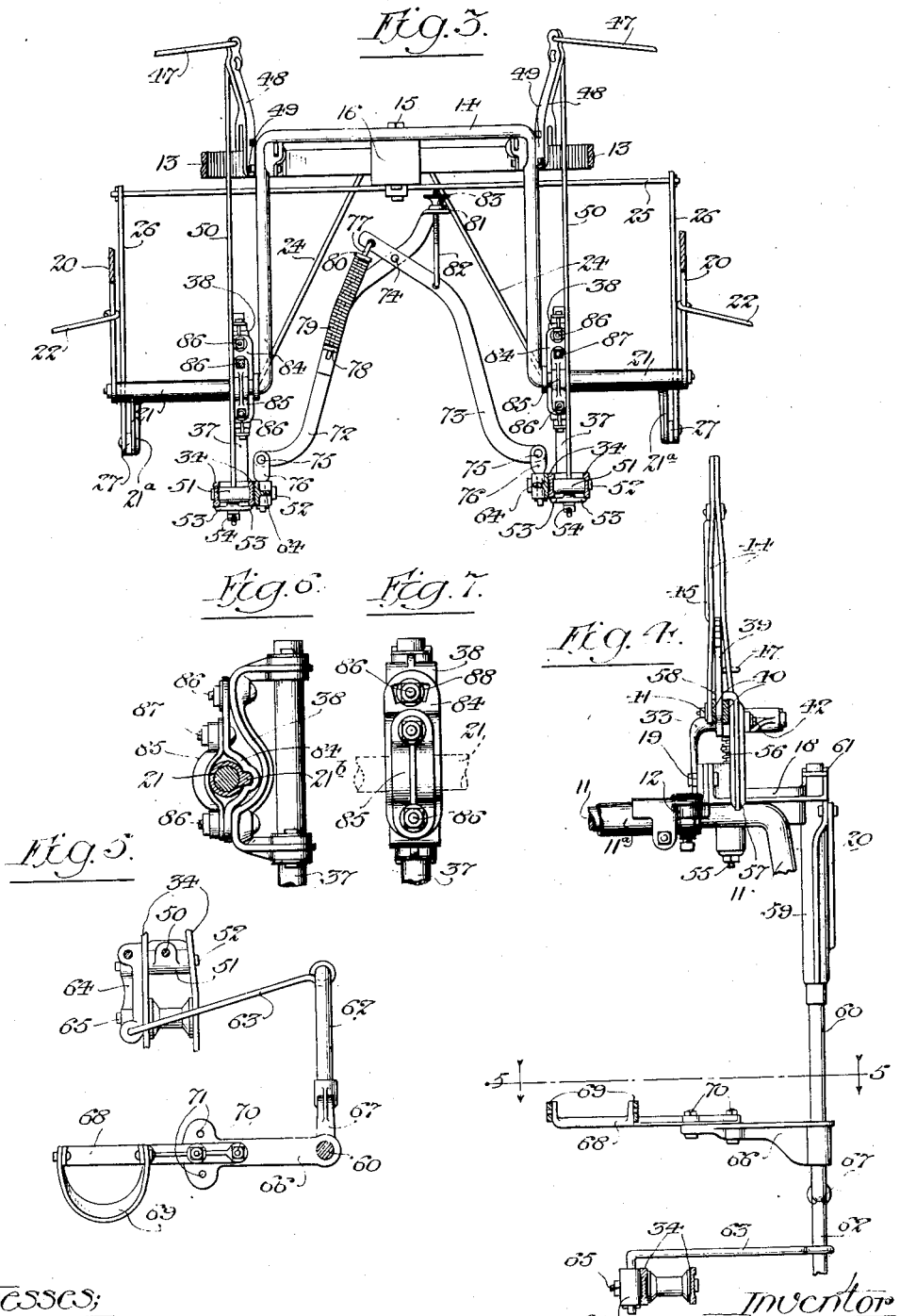

CLEMENT W. MICHAEL, OF RACINE, WISCONSIN, ASSIGNOR TO J. I. CASE PLOW WORKS, OF RACINE, WISCONSIN, A CORPORATION.

CULTIVATOR.

No. 897,221.    Specification of Letters Patent.    Patented Aug. 25, 1908.

Original application filed July 7, 1906, Serial No. 320,506. Divided and this application filed February 1, 1908. Serial No. 413,806.

*To all whom it may concern:*

Be it known that I, CLEMENT W. MICHAEL, a citizen of the United States, and a resident of Racine, county of Racine, and State of Wisconsin, have invented certain new and useful Improvements in Cultivators, for which the following is a specification.

The present invention is a division of a prior application filed by me on July 7, 1906 for improvements in cultivators, Serial No. 320,506.

The improvement relates to riding of wheeled cultivators of the straddle-row type and seeks to provide a simple form of yielding connection between the gangs or shovel beams which cultivate the ground on opposite sides of the row of plants, together with means for adjusting the yielding connection to hold the gangs or shovel beams at any desired distance apart, and with suitable foot levers or shifters for guiding and separating the gangs or swinging shovel beams. The invention consists in the features of construction, combinations and arrangements of parts hereinafter set forth, illustrated in the accompanying drawings and more particularly pointed out in the appended claims.

In the drawings Figure 1 is a plan view of the improved cultivator, Fig. 2 is a longitudinal section on line 2—2 of Fig. 1. Fig. 3 is a detail section on lines 3—3 of Figs. 1 and 2. Fig. 4 is a detail section on line 4—4 of Fig. 2. Fig. 5 is a detail section on line 5—5 of Fig. 4. Figs. 6 and 7 are detail views of the coupling for the shovel beams.

The cultivator is of the straddle-row type and the supporting wheels 10 are journaled upon spindles at the ends of an arched axle 11. The wheel sections are swiveled and adjustably secured in the ends of a tubular member or pipe 11$^a$ secured by brackets 12 to the side-bars 13 of the frame. Adjacent their forward ends, the side-bars 13 are secured to the upper portion of an arch bar 14 that is centrally connected by a bolt 15 to the tongue 16. From the arch bar 14 the side-bars extend forwardly and are secured by bolts 17 to the sides of the tongue 16. A pair of brackets 18 (see Figs. 1 and 4) are mounted above the ends of the upper horizontal portion of the arched axle 11 and are secured to upright flanges on the brackets 12 by bolts 19. Brace-bars 20 are secured at their rear ends to the brackets 18 and extend forwardly and downwardly therefrom to the horizontal spindles on the lower portion of the arch bar 14. Brace-rods 22 are connected at their rear ends to the lower ends of the arched axle 11 and at their forward ends are each arranged to adjustably engage one of a series of holes 23 in the adjacent brace-bar 20. By adjusting the brace rods 22, the depending portions of the arched axle may be swung back and forth and set in proper position to balance the machine with riders of different weight. Brace-rods 24 (see Figs. 1 and 2) are connected at their rear ends to the spindles of the arch bar 14 and these brace-rods extend upwardly and forwardly and are connected by one of the bolts 17 to the pole 16. A draft evener 25 is pivotally connected to the rear end of the pole 16 and links 26 swiveled to and depending from the ends of the draft evener 25 are connected at their lower ends by links 27 to arms 21$^a$ that are fixed to and depend from sleeves 21 swiveled on the spindles of the arch bar 14. The links 26 are each provided with a series of holes 28 which afford suitable means for connecting the swingle-trees to the cultivator.

A rider's seat 29 is mounted upon the rear ends of a pair of horizontal bars 30 which extend forwardly and diverge outwardly therefrom. Supporting loops 31 secured to the seat bars 30, extend around the upper horizontal portion 11$^a$ of the arched axle and the forward ends of the seat bars 30 are connected to the brace bars 32 which are secured to the side-bars 13 of the frame and to brackets 33 extending upwardly from the side-bars.

The gangs or shovel beams and the ground tools carried thereby may be of any usual or suitable construction, but preferably each of the shovel beams is formed of separate sections 34 that are bolted together in offset relation to carry the shovels 35 on the shanks 36 in proper position. At their forward end, the sections 34 of the shovel beams are secured to upright standards 37 that are swiveled in the brackets or couplings 38 so that the gangs or shovel beams may be swung laterally. Coupling members 38 are adjustably secured to the sleeves 21 on the spindles of the bar 14 so that the gangs or shovel beams may be arranged at different distances apart. The coupling members are also swiveled upon the horizontal spindle 21 so that the gangs or shovel beams may be shifted vertically to and from working position.

A raising and lowering shifter is provided for each of the gangs or shovel beams and comprises a toothed segment 39 pivoted to the upright bracket 33 and extending rearwardly therefrom. An operating hand-lever 40 is connected by a pivot bolt 41 to the toothed segment and extends rearwardly within reach of the operator. A bolt 42 on the hand-lever 40 extends through a slot 43 in the rear end of the segment 39 so that the hand-lever is connected to the segment by a pin-and-slot or lost motion connection. A depth regulating shifter or lever 44 is pivotally connected by the bolt 41 to the segment 39 and is provided with a dog 45 arranged to engage one of the notches of the segment 39 so that the depth-regulating lever 44 may be adjustably locked in position upon the segment. The dog 45 is operated by the usual trip or handle 46 pivoted to the lever 44. The depth-regulating lever is connected to the corresponding gang or shovel beam preferably by means of a rod or link 47 connected to the lever and to the upper end of a rock arm 48 that is connected to the adjacent side-bar 13 by a pivot bolt 49 and that extends upwardly from the side-bar. The rock arm 48 is connected to the adjacent gang or shovel beam by a link 50 that extends downwardly through an opening in a sleeve 51 that is mounted upon a cross-bolt 52 between the sections 34 of the shovel beam (see Fig. 5). The sleeve 51 is provided with projecting lugs 53 extending beneath the section 34 of the shovel beam and a nut 54 threaded on the lower end of the link 50 engages the lower face of the sleeve 51. This one-way connection between the rod or link 50 and the shovel beam allows the latter to rise and fall as it passes over irregularities in the ground while at the same time, the raising and lowering lever 40 and the depth-regulating lever 44 may be employed to raise and lower the gang or shovel beam through the medium of the link or rod 47, rock arm 48 and the link or rod 50.

In the lowered position of the gang or shovel beam, the segment 39 rests upon a stop-bolt 55 that is surrounded by a cushion spring 56. The segment is held in this position by a latch 57 (see Figs. 2 and 4) that is pivoted thereto and which is arranged to engage a flange on the bracket 18. This latch is provided at its upper end with a laterally-projecting lug 58 which extends through the slot 43 in the segment and engages the upper edge of the lever 40.

In raising the gang or shovel beam the hand-lever 40 is moved upwardly and forwardly by the operator. The initial movement of the hand-lever takes up the lost motion between it and the segment 39 and also serves, by the engagement of the hand-lever with the lug 58 to trip the latch 57. The further movement of the hand lever will then turn to shift the segment and raise the gang or shovel beam through the medium of the link or rod 47, rock arm 48 and connecting rod 50. The hand-lever 44 may be adjusted as desired to change the working depth of the gang without disturbing the raising or lowering lever 40 or the segment 39. Moreover, the shift of the lever 40 does not disturb the adjustment of the lever 44 so that the gangs may be quickly raised by the lever 40 and quickly returned to the same working position.

The improved raising and lowering mechanism described is fully set forth and claimed in the prior application referred to and forms no part of the present invention.

Each of the gangs or shovel beams is provided with means whereby it may be swung or guided laterally by the operator in working over the ground. For this purpose, the bracket 18 is provided at its outer end with a vertical sleeve 59 (see Figs. 1, 2 and 4) through which extends the upper end of a rock-shaft 60. The shaft 60 is held in place within the sleeve 59 by a pin 61 extending through its upper end. At its lower end the shaft 60 is provided with a forwardly-extending crank portion 62, the vertical depending end of which crank extends through an eye in the outer end of a link 63. This link extends inwardly over the bars 34 of the adjacent shovel beam, and its inner downturned end engages a vertical opening in a bracket 64 that is secured to the inner face of the shovel beam by a bolt 65 and by the bolt 52. Arms 66 are fixed to the lower portions of the shafts 60 adjacent the cranks 62 thereof and each arm is provided at its outer end with an offset portion 67 that engages the adjacent crank 62. The arms 66 extend inwardly from the shaft 60 and are provided with foot pieces 68 having heel straps 69. By means of these arms the rider may readily guide the shovel beams as desired with his feet. The foot-pieces 68 are preferably connected by two bolts 70 to the arms 66 one of which is arranged to engage any one of a series of holes 71 in the arm so that the foot-pieces may be adjusted in position. By this adjustment the foot-pieces may be brought within convenient reach of different operators even though the shovel beams or gangs are placed at different distances apart. As the beams are raised and lowered the link connection 63 slides up and down in the vertical portions of the cranks 62.

The shovel beams or gangs are connected so as to swing laterally together. This connection is formed of separate sections adjustably and yieldingly connected so that the beams may be held at any desired distance apart, and so that they may be spread apart by the operator at any time if desired. The connection is preferably arched to extend over the row of plants, as shown in Fig. 3, and comprises a pair of upwardly and inwardly inclined links 72 and 73 which are crossed at their upper ends and connected by a pivot bolt 74. At their lower ends, the links 72 and 73 are connected by horizontal pivot pins 75 to forked couplings 76 that are vertically swiveled in the brackets 64 on the shovel beams (see Figs. 2, 3 and 5). A rod 77 is connected to the end of the link 73 and extends through an ear or bracket 78 fixed to the central portion of the link 72. A cushion spring 79 is coiled about the rod 77 and extends between the lug or bracket 78 and a collar 80 fixed to the upper end of the rod. The upper end of the link 72 (see Figs. 1 and 3) is provided with a rearwardly bent portion or lug 81. A rod 82 connected to the link 73 extends upwardly through the lug 81, and a nut 83 threaded on the rod engages the lug as shown. The cushion spring 79 tends to draw the links 72 and 73 and the shovel beams or gangs connected thereto together. It also forces the lug 81 against the nut 83. By adjusting the hand-nut 83, the shovel beams may be set and yieldingly held at the desired distance apart. The operator, by forcing forwardly on both of the foot-pieces 68 of the arm 66, may press the gangs or shovel beams apart against the tension of the spring 79, so as to avoid obstructions or to guide the shovels in proper relation to the plant rows. When the operator relieves the pressure on the foot-pieces 68, the spring 79 will return the shovel beams to their normal position at a fixed distance apart. When the links 72 and 73 are separated against the pressure of the spring 79 by screwing down the nut 83 upon the rod 82 and so separate the shovel beams or gangs, the latter will turn in the couplings 38 which support the forward end of the gangs. These couplings 38 are preferably connected to the sleeves 21 on the spindles of the arch bar 14, each by means of two straps 84 and 85 which are bent to surround the sleeve (see Figs. 6 and 7). The strap 84 is provided with a portion engaging a rib 21$^b$ on the sleeve and is connected to the U-shaped coupling piece 38 by two bolts 86. The strap 85 is connected to the strap 84 by one of the bolts 86 and by a bolt 87. The straps 84 and 85 are thus clamped upon the sleeves 21 which turn on the spindles of the arch bar, so that the shovel beams or gangs may be shifted vertically to and from working position. By loosening bolt 87 and the lower bolt 86, the straps 84 and 85 together with the couplings 32 may be adjusted along the sleeves 21 to hold the forward ends of the gangs or shovel beams at different distances apart. The upper bolt 86 preferably extends through a segmental slot 88 in the strap 84 so that the angular position of the coupling-member 38 and the shovel beams relatively to the spindles of the arch bar may be adjusted as desired to hold the shovels level with the ground.

It is obvious that numerous changes may be made in the details of construction and arrangements of parts without departure from the essentials of the invention.

Having described my invention, what I claim as new and desire to secure by Letters Patent, is:—

1. In a cultivator, the combination with the frame, of two laterally-swinging gangs hung on the frame, a yielding connection between said gangs and shift-levers for guiding said gangs, substantially as described.

2. In a cultivator, the combination with the frame, of two laterally swinging gangs hung thereon, a yielding connection between said gangs, means for adjusting said connection to hold said beams at different distances apart and foot-levers for guiding and separating said shovel beams, substantially as described.

3. In a cultivator, the combination with the frame, of two laterally and vertically swinging gangs hung on the frame, a yielding connection between said gangs, and means for guiding and spreading said gangs comprising a pair of vertical crank shafts journaled in the frame, connections between said crank shafts and said gangs and foot-levers mounted on said shaft, substantially as described.

4. In cultivators, the combination with the frame having the horizontal supporting spindles at its forward part, of sleeves on said spindles, couplings laterally adjustable on said sleeves, two gangs connected at their forward ends to said couplings, a yielding connection between said gangs, and means for adjusting said yielding connection to hold said gangs at different distances apart, substantially as described.

5. In cultivators, the combination with the frame having horizontal supporting spindles at its forward end, of sleeves on said spindles, couplings adjustable laterally upon said sleeves, two gangs pivotally connected at their forward ends to said couplings to swing laterally and an adjustable connection between said gangs for holding the same at different distances apart.

6. In cultivators, the combination with the frame having an arched bar at its forward end provided with horizontal spindles, of a pair of couplings mounted upon said spindles adjustable laterally and free to swing thereon, a pair of gangs having vertical standards at their forward ends vertically swiveled in said couplings, connection between said gangs, means for adjusting said connection to hold said gangs at different distances apart, means for raising and lowering said gangs, and means for guiding and separating said gangs, substantially as described.

7. In cultivators, the combination with the frame, of two laterally swinging shovel beams hung thereon, and a yielding connection between said shovel beams comprising a pair of links coupled respectively to said shovel beams, a spring interposed between said links and an adjustable part connected to one of said links and arranged to engage a lug on the other link to hold said beams at different distances apart, substantially as described.

8. In cultivators, the combination with the frame, of a pair of laterally and vertically swinging shovel beams hung thereon and a yielding connection between said shovel beams comprising a pair of links, couplings vertically swiveled to said beams and to which the ends of said links are horizontally pivoted, a spring interposed between said links and an adjusting nut connected to one of said links arranged to engage the lug on the other link, substantially as described.

9. In a cultivator, the combination with the frame, of a pair of laterally swinging shovel beams hung on the frame and an arched connection between said beams comprising a pair of links connected at their lower, outer ends to said shovel beams and extending upwardly and inwardly therefrom, the upper ends of said links being pivoted together, a spring interposed between said links and means for adjusting said links to hold said beams at different distances apart, substantially as described.

10. In a cultivator, the combination with the frame, of a pair of shovel beams hung thereon and an arched connection between said beams comprising a pair of links, couplings vertically swiveled to said links to which the lower, outer ends of said links are horizontally pivoted, said links extending upwardly and inwardly from said couplings with their upper, overlapped ends pivoted together, a cushion spring interposed between the end of one of said links and the other of said links, a rod connected to the central portion of said first mentioned link and extending through a lug on the end of the other link, and a nut adjustably threaded on said rod and engaging said lug, substantially as described.

11. In a riding cultivator, the combination with the frame and the supporting wheels therefor, of two gangs hung on said frame to swing laterally, and a connection between said gangs arranged to hold the same a definite distance apart, said connection being arranged to yield to permit the spreading of said gangs, substantially as described.

12. In a straddle-row, riding cultivator, the combination with the frame and the supporting wheels therefor, of two gangs hung on the frame to swing laterally and vertically, and an arched connection between said gangs arranged to hold the same a definite distance apart, said connection being arranged to yield to permit the spreading of said gangs, substantially as described.

13. In a straddle-row, riding cultivator, the combination with the frame and the supporting wheels therefor, of two gangs hung on the frame to swing laterally and vertically, and an arched connection between said gangs comprising a pair of links, means for adjustably connecting said links to hold said gangs at different distances apart, and a spring interposed between said links arranged to permit the spreading of said gangs, substantially as described.

14. In a straddle-row, riding cultivator, the combination with the frame and supporting wheels therefor, of two gangs hung on said frame to swing laterally and vertically, laterally adjustable couplings for supporting the forward ends of said gangs, an adjustable arched connection between said gangs for holding the same at different distances apart, said connection being yielding to permit the spreading of said gangs, and a pair of foot-levers connected to said gangs for guiding and spreading the same, substantially as described.

15. In a straddle-row, riding cultivator, the combination with the frame and the supporting wheels therefor, of two gangs hung on the frame to swing laterally and vertically, laterally adjustable couplings for supporting the forward ends of the gangs, an arched connection between said gangs comprising a pair of links, means for adjustably connecting said links to hold the gangs at different distances apart, a spring interposed between said links to permit the spreading of said gangs, and a pair of foot-levers connected to said gangs to guide and spread the same, substantially as described.

CLEMENT W. MICHAEL.

Witnesses:
ROY FRED ADAMS,
ROY WINFIELD MARTIN.